United States Patent
Keller et al.

(10) Patent No.: US 8,266,623 B2
(45) Date of Patent: Sep. 11, 2012

(54) SYSTEM, METHOD, AND COMPUTER PROGRAM PRODUCT FOR DECOMPOSING A SAMPLING TASK INTO A PLURALITY OF JOBS

(75) Inventors: Alexander Keller, Berlin (DE); Leonhard Grünschloβ, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 380 days.

(21) Appl. No.: 12/432,498

(22) Filed: Apr. 29, 2009

(65) Prior Publication Data

US 2010/0281480 A1 Nov. 4, 2010

(51) Int. Cl.
*G06F 9/46* (2006.01)
*G06F 7/38* (2006.01)
*G06T 15/50* (2006.01)

(52) U.S. Cl. ......... 718/102; 718/100; 345/426; 708/444
(58) Field of Classification Search .................. None
See application file for complete search history.

(56) References Cited

U.S. PATENT DOCUMENTS

| 6,911,976 B2 * | 6/2005 | Abramov | 345/426 |
| 2005/0278406 A1 * | 12/2005 | Keller | 708/444 |

FOREIGN PATENT DOCUMENTS

| WO | 02099751 A1 | 12/2002 |
| WO | 2007022439 A2 | 2/2007 |

OTHER PUBLICATIONS

Examination Report from German Patent Application No. 10 2010 028 364.9, dated Jul. 28, 2011.

* cited by examiner

*Primary Examiner* — Meng An
*Assistant Examiner* — Bing Zhao
(74) *Attorney, Agent, or Firm* — Zilka-Kotab, PC

(57) ABSTRACT

A system, method, and computer program product are provided for decomposing a sampling task into a plurality of jobs. In operation, a sampling task is identified. Additionally, the sampling task is decomposed into a plurality of jobs. Further, each of the plurality of jobs are processed in parallel. Still yet, each of the plurality of jobs are allowed to terminate independently of the other plurality of jobs.

21 Claims, 4 Drawing Sheets

SYSTEM, METHOD, AND COMPUTER PROGRAM PRODUCT FOR DECOMPOSING A SAMPLING TASK INTO A PLURALITY OF JOBS

FIELD OF THE INVENTION

The present invention relates to processing tasks, and more particularly to decomposing a processing task into a plurality of jobs for parallel processing.

BACKGROUND

Previously, a technique for the parallel generation of photon maps was introduced. This technique utilized many theoretic arguments that allowed the partitioning of a Halton sequence into a number of sequences. However, the arguments implemented are complex. Furthermore, transferring this technique to (t, s)-sequences and rank-1 lattice sequences in a straightforward manner has not been successful. There is thus a need for addressing these and/or other issues associated with the prior art.

SUMMARY

A system, method, and computer program product are provided for decomposing a sampling task into a plurality of jobs. In operation, a sampling task is identified. Additionally, the sampling task is decomposed into a plurality of jobs. Further, each of the plurality of jobs are processed in parallel. Still yet, each of the plurality of jobs are allowed to terminate independently of the other plurality of jobs.

DETAILED DESCRIPTION

Figure 1:
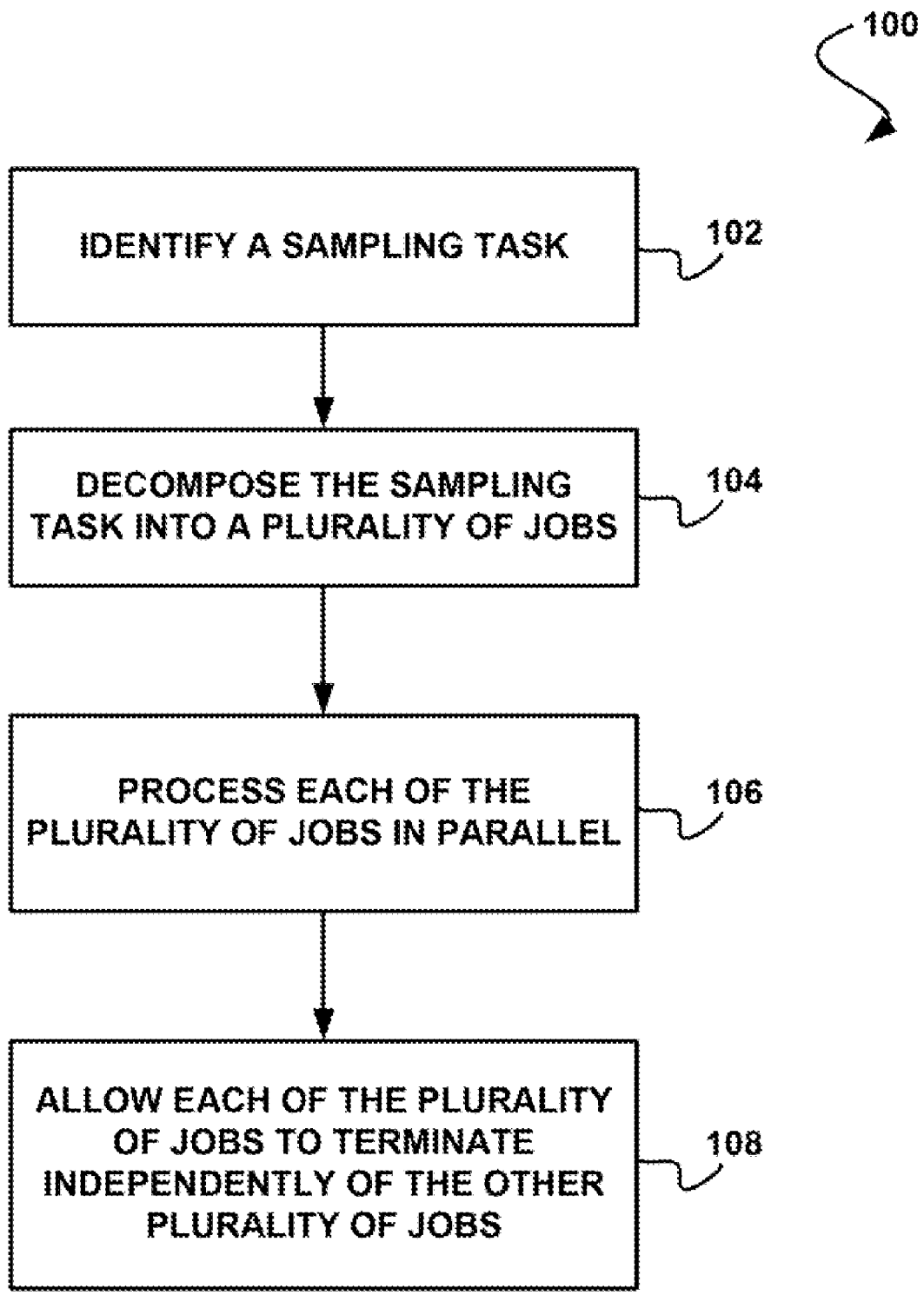
FIG. 1 shows a method for decomposing a sampling task into a plurality of jobs, in accordance with one embodiment.

FIG. 1 shows a method 100 for decomposing a sampling task into a plurality of jobs, in accordance with one embodiment. As shown, a sampling task is identified. See operation 102.

In the context of the present description, a sampling task refers to any task that may be decomposed into a plurality of other tasks or jobs. For example, in one embodiment, the sampling task may include a single low-discrepancy sequence. In another embodiment, the sampling task may include a task associated with the processing of a group of rays or vectors. In various other embodiments, the sampling task may be associated with a radical inverse based point sequence, a matrix generated point sequence, a permutation generated point sequence, and/or a lattice sequence.

Once the sampling task is identified, the sampling task is decomposed into a plurality of jobs. See operation 104. In various embodiments, the sampling task may be decomposed into any number of jobs. In this case, a job refers to any portion of the sampling task that was generated as a result of the decomposition.

In one embodiment, decomposing the sampling task into the plurality of jobs may include decomposing the sampling task into s-dimensional samples, where s is an integer. In this case, the s-dimensional samples may be generated by exploiting a stratification of one dimension of s+1 dimensional samples. As another option, the s-dimensional samples may be generated by stratifying one of the s dimensions and resealing resulting samples to cover an entire domain of sampling.

Furthermore, in one embodiment, the samples may be taken from at least one of a radical inverse based point sequence, a matrix generated point sequence, a permutation generated point sequence, or a lattice sequence. As another option, stratification properties associated with the stratifying may be exploited to efficiently generate the samples for each of the plurality of jobs. The stratification properties may include any stratification properties such as matrix generated points, permutation generated points, and lattice sequences. In these cases, the stratification properties may be exploited directly and without rejection to efficiently generate the s-dimensional samples for each of the plurality of jobs.

Once the sampling task is decomposed into a plurality of jobs, each of the plurality of jobs may be processed in parallel. See operation 106. Still yet, each of the plurality of jobs are allowed to terminate independently of the other plurality of jobs. See operation 108.

It should be noted that the processing of at least one of the plurality of jobs may be capable of occurring without communication between at least one other of the plurality of jobs. For example, one or more threads associated with a processor may be utilized to process the plurality of jobs. In this case, each of the threads may process the jobs without communicating with the other threads.

Furthermore, each of the plurality of jobs may be allowed to terminate independently of the other plurality of jobs without communication between the plurality of jobs. In one embodiment, a termination time of each of the plurality of jobs may be substantially equal. In this case, a substantially equal termination time indicates that the difference in the termination time between the jobs is negligible and/or insignificant.

As noted above, in one embodiment, the sampling task may include one low-discrepancy point sequence. In this case, decomposing the sampling task into the plurality of jobs may include partitioning one low-discrepancy point sequence into a plurality of low discrepancy sequences. As an option, a portion of the plurality of low discrepancy sequences may be utilized for processing. As another option, all of the plurality of low discrepancy sequences may be utilized for processing.

In another embodiment, decomposing the sampling task into the plurality of jobs may include partitioning one highly uniform point sequence into a plurality of highly uniform point sequences. As an option, only a portion of the plurality of highly uniform point sequences may be utilized for processing. As another option, all of the plurality of highly uniform point sequences may be utilized for processing.

More illustrative information will now be et forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
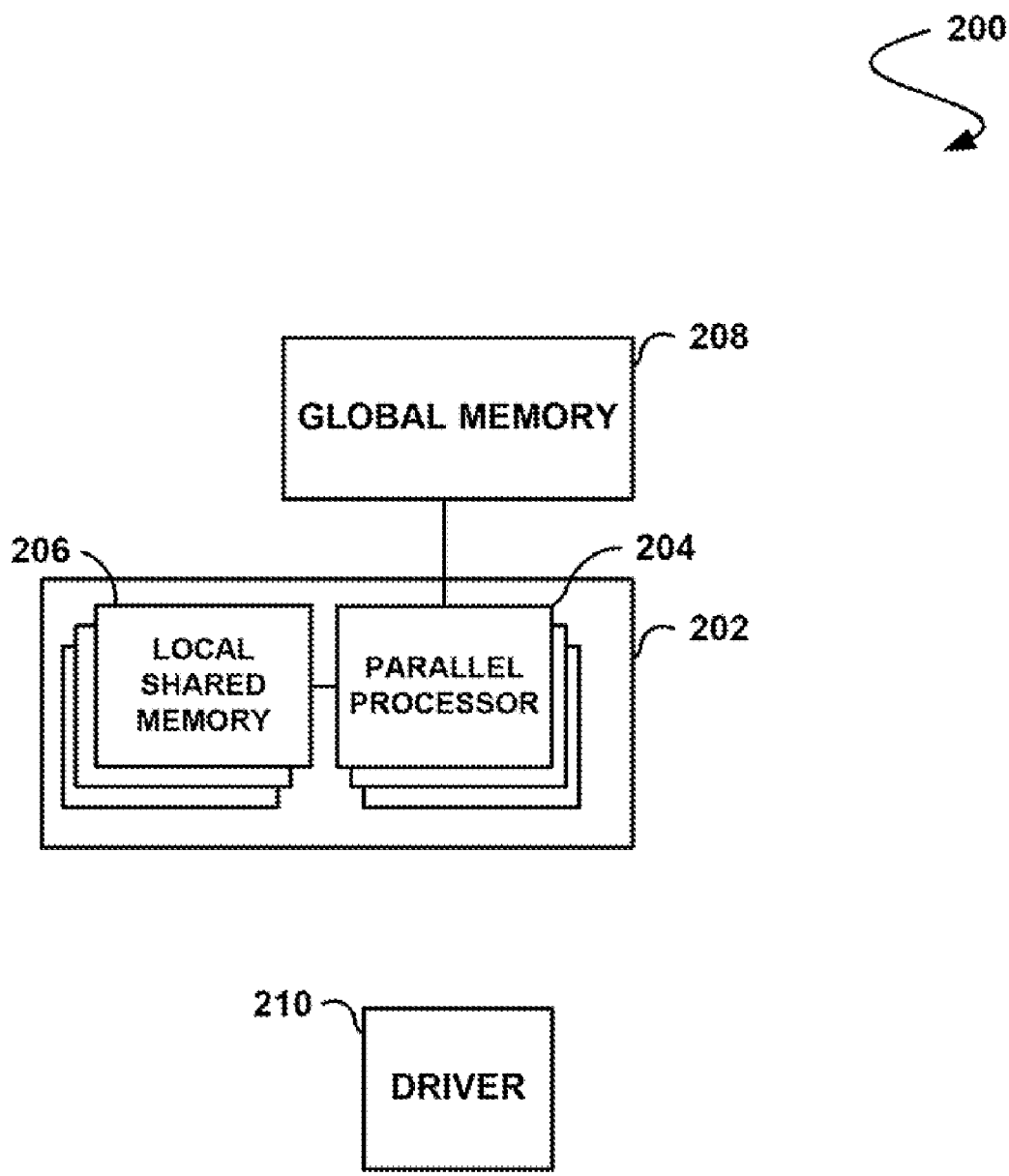
FIG. 2 shows a system for decomposing a sampling task into a plurality of jobs, in accordance with another embodiment.

FIG. 2 shows a system 200 for decomposing a sampling task into a plurality of jobs, in accordance with another embodiment. As an option, the present system 200 may be implemented in the context of the functionality and architecture of FIG. 1. Of course, however, the present system 200 may be implemented in any desired environment. It should also be noted that the aforementioned definitions may apply during the present description.

As shown, a parallel processing architecture 202 is provided. Such parallel processing architecture 202 includes a plurality of parallel processors 204. While not shown, such parallel processors 204 may be capable of operating on a predetermined number of threads. To this end, each of the parallel processors 204 may operate in parallel, while the corresponding threads may also operate in parallel.

In one embodiment, the parallel processing architecture 202 may include a single instruction multiple data (SIMD) architecture. In such a system, the threads being executed by the processor are collected into groups such that, at any instant in time, all threads within a single group are executing precisely the same instruction but on potentially different data.

In another embodiment, the foregoing parallel processing architecture 202 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 202 may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture 202 may include local shared memory 206. Each of the parallel processors 204 of the parallel processing architecture 202 may read and/or write to its own local shared memory 206. This shared memory 206 may consist of physically separate memories associated with each processor or it may consist of separately allocated regions of one or more memories shared amongst the processors 204. Further, in the illustrated embodiment, the shared memory 206 may be embodied on an integrated circuit on which the processors 204 of the parallel processing architecture 202 are embodied.

Still yet, global memory 208 is shown to be included. In use, such global memory 208 is accessible to all the processors 204 of the parallel processing architecture 202. As shown, such global memory 208 may be embodied on an integrated circuit that is separate from the integrated circuit on which the processors 204 of the aforementioned parallel processing architecture 202 are embodied. While the parallel processing architecture 202 is shown to be embodied on the various integrated circuits of FIG. 2 in a specific manner, it should be noted that the system components may or may not be embodied on the same integrated circuit, as desired.

Still yet, the present system 200 of FIG. 2 may further include a driver 210 for controlling the parallel processing architecture 202, as desired. In one embodiment, the driver 210 may include a library, for facilitating such control. For example, such library 210 may include a library call that may instantiate the functionality set forth herein. Further, in another embodiment, the driver 210 may be capable of providing general computational capabilities utilizing the parallel processing architecture 202 (e.g. a graphics processor, etc.). An example of such a driver may be provided in conjunction with the CUDA™ framework provided by NVIDIA Corporation. In use, the driver 210 may be used to control the parallel processing architecture 202 for decomposing a sampling task into a plurality of jobs.

Figure 3:
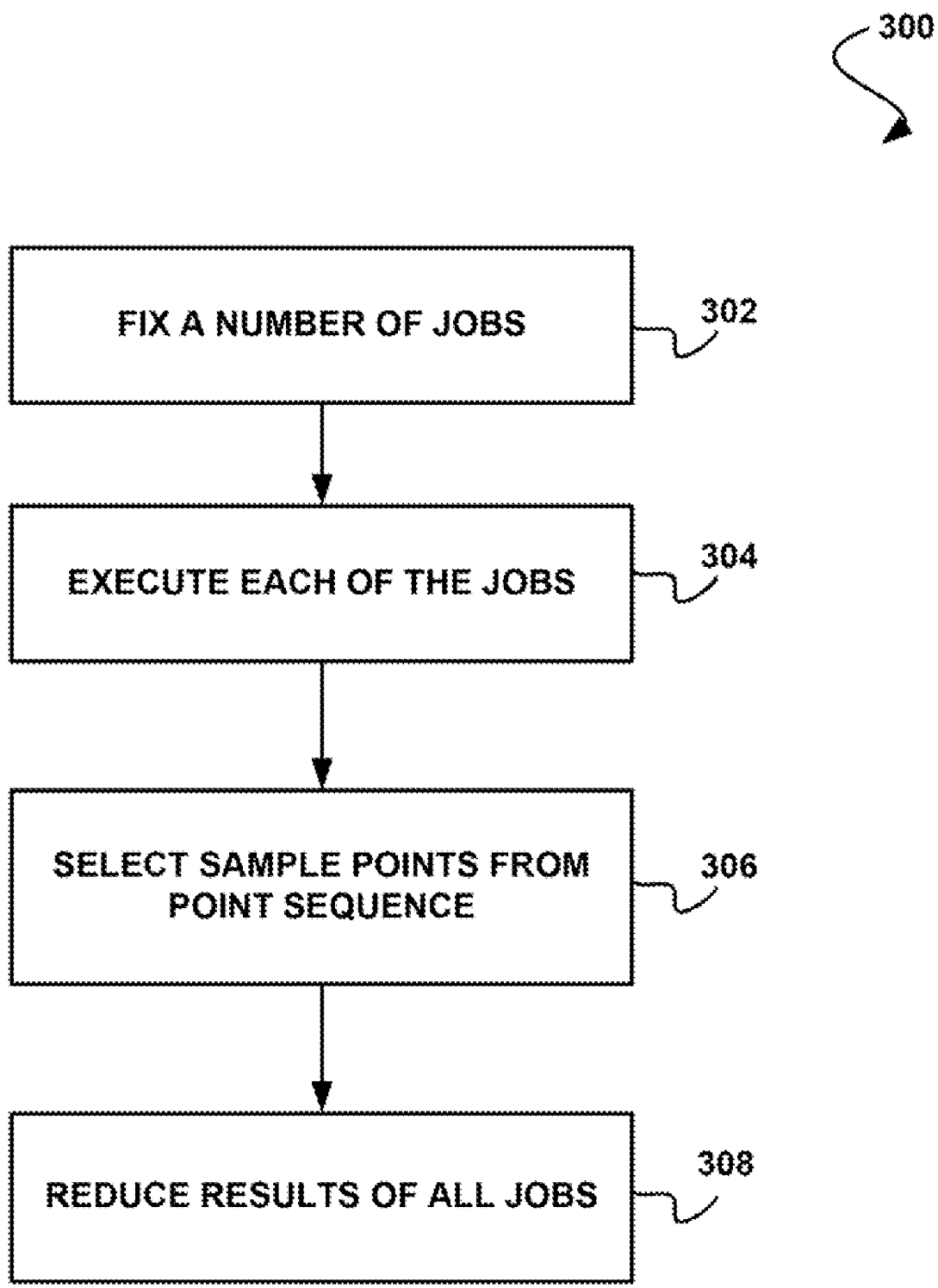
FIG. 3 shows a method decomposing a sampling task into a plurality of jobs, in accordance with another embodiment.

FIG. 3 shows a method 300 decomposing a sampling task into a plurality of jobs, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, a number of jobs are fixed. See operation 302. In this case, the number of jobs may be fixed as well as a suitable low discrepancy or highly uniform sequence of points. The jobs may be any jobs associated with a sampling task.

The jobs are then executed. See operation 304. In this case, the jobs may be evaluated in parallel.

Furthermore, the sample points may be selected from the point sequence, where the actual number of points may be chosen adaptively. See operation 306. The results of all the jobs are then reduced, which may include summing up the partial results or constructing the union of the partial results. See operation 308.

As an option, using this technique, a generalized approach for parallelizing quasi-Monte Carlo methods may be implemented. By considering the distribution of computing jobs across a multiprocessor as an additional problem dimension, the straightforward application of quasi-Monte Carlo methods implies parallelization. In one embodiment, this approach may be implemented to partition a single low-discrepancy sequence into multiple low-discrepancy sequences.

This allows for adaptive parallel processing without synchronization. In other words, communication may only be required once for the final reduction of the partial results. The resulting algorithms are deterministic and are independent of the number of processors, which, among other aspects, is different than other techniques.

For example, one technique utilizes a parallel generation of photon maps. Using this technique, a number theoretic arguments we utilized to partition one Halton sequence into a number of sequences. Because all of these sequences are of low discrepancy, each job using such a subsequence consumed about a similar number of samples when independently adaptively terminated without communication for synchronization.

The resulting union of samples is a complete initial segment of the Halton sequence followed by a comparatively small segment of samples, where the Halton sequence is used only partially. However, transferring the approach to (t, s)-sequences is not straight forward. Furthermore, thus far, using this technique, rank-1 lattice sequences have not been considered.

Thus, by utilizing the method 300, a generalized and simplified argument may be implemented for partition quadrature rules in the context of parallel processing. Further, efficient algorithms may be derived for generating the stream of samples inside each parallel job.

In one embodiment, the distribution of jobs over multiple processors working in parallel may be considered as one additional problem dimension. For the example of the integration problem, this means that, in addition to integrand dimensions, integration should occur over the maximum number N of possibly parallel jobs. In this case, a job $j \in \{0, \ldots, N-1\} \subset \mathbb{N}_0$ may be selected by the characteristic function $$X_j(x') := \begin{cases} 1 & j \leq x' < j+1 \\ 0 & \text{else.} \end{cases}$$

This function assigns the interval [j, j+1) to the j-th job.

$$1 - \sum_{j=0}^{N-1} \chi_j(x') \text{ for } 0 \leq x' < N \qquad \text{Equation 1}$$

By exploiting Equation 1 above, the s-dimensional integral of a function $f$ over the unit cube may be rewritten as:

$$\int_{[0,1)^s} f(x)dx = \frac{1}{N}\int_0^N 1 \cdot \int_{[0,1)^s} f(x)dx\,dx'$$

$$= \frac{1}{N}\int_0^N \left(\sum_{f=0}^{N-1} \chi_f(x')\right) \cdot \int_{[0,1)^s} f(x)dx\,dx'$$

$$= \frac{1}{N}\int_0^N \sum_{f=0}^{N-1} \chi_f(x') \cdot \int_{[0,1)^s} f(x)dx\,dx'$$

$$\sum_{f=0}^{N-1} \underbrace{\int_{[0,1)}\int_{[0,1)^s} \chi_f(N \cdot x') \cdot f(x)dx\,dx'}_{=S_j}.$$

In this case, an integral over the number of jobs N is first added, the partition of one from Equation 1 is inserted, and everything is finny transformed to the s+1-dimensional unit cube.

Selecting one s+1-dimensional low-discrepancy sequence (or highly uniform point sequence or any quadrature rule) of points $x_i = (x_{i,0}, \ldots, x_{i,s})$ to simultaneously approximate all summands as shown in Equation 2, lends itself to a parallelization scheme.

$$S_j \approx \frac{1}{n}\sum_{i=0}^{n-1} \chi_j(N - x_{i,c}) \cdot f(x_{i,1}, \ldots, x_{i,c-1}, x_{i,c+1}, \ldots, x_{i,s}) \qquad \text{Equation 2}$$

Due to the above property from Equation 1, the characteristic function $\chi_j$ partitions the set of samples by job number j. In fact, an arbitrarily chosen dimension c may be partitioned into N equally sized intervals and each job may only consume the points of the sequence which fall into its interval.

It should be noted that, in one embodiment, the partitions may also be scaled to fill the (s+1)-dimensional unit cube again. In other words, the component chosen for selecting samples for each job may be reused, which may be more efficient since one component less must be generated. Thus, for an s-dimensional integrand only s-dimensional samples may need to be generated. Therefore, Equation 2 may be reformulated as shown in Equation 3.

$$S_j \approx \frac{1}{n}\sum_{i=0}^{n-1} \chi_j(N \cdot x_{i,c}) \cdot f\left(\begin{array}{c} x_{i,1}, \ldots, x_{i,c-1}, N \cdot \\ x_{i,c} - j, x_{i,c+1}, \ldots, x_{i,s} \end{array}\right) \qquad \text{Equation 3}$$

It should be noted that, in some cases, using this variant, the combination of the first dimension of the samples assigned to different jobs may not be well-stratified.

Given a low discrepancy sequence $x_i$, the point sets $P_j := \{x_i : \chi_j(N \cdot x_{i,c}) = 1, i \in \mathbb{N}_0\} = \{x_i : j \leq N \cdot x_{i,c} < j+1, i \in \mathbb{N}_0\}$ are low discrepancy sequences, too, because they result from a partitioning by planes perpendicular to the axis c, which does not change the order of discrepancy.

Similarly, any subsequence $(x_{i,1}, \ldots, x_{i,c-1}, x_{ic+i}, \ldots, x_{i,s})$ resulting from the omission of the component c, is of low discrepancy. In one embodiment, this may be interpreted as a simple way to partition a low discrepancy sequence into low discrepancy sequences. For the common number-theoretic constructions of quasi-Monte Carlo point sequences and a suitable choice of N, the integer part of $N \cdot x_{i,c}$ results in successive permutations of $\{0, \ldots, N-1\}$. Based on this observation efficient algorithms may be derived to enumerate the set shown in Equation 4.

$$P_j = \{x_{i_{j,\iota}} : \iota \in \mathbb{N}_0\} \qquad \text{Equation 4}$$

In this case, efficient algorithms to enumerate the set in Equation 4 may be derived using an index of the form $i_{j,\iota} := lN + k_{j,\iota}$, where $k_{j,\iota} \in \{0, \ldots, N-1\}$.

It should be noted that some standard notations are used throughout the derivations utilized in the context of the above methods. For example, for any number $r \in \mathbb{R}_0^+$ the k-th digit $a_k(r) \in \{0, \ldots, b-1\}$ in integer base b is defined by $$r = \sum_{k=-\infty}^{\infty} a_k(r)b^k.$$

It should also be noted that this definition includes fractional digits for k<0. The matrix generated radical inverses shown in Equation S in base b may be computed using a generator matrix C.

$$\phi_{b,C} : \mathbb{N}_0 \to \mathbb{Q} \cap [0, 1) \qquad \text{Equation 5}$$

$$i \mapsto \begin{pmatrix} b^{-1} \\ \vdots \\ b^{-M} \end{pmatrix}^T \left[ C \begin{pmatrix} a_0(i) \\ \vdots \\ a_{M-1}(i) \end{pmatrix} \right]$$

In theory these matrices are infinite-dimensional, however, in practice they are finite due to the finite precision of computer arithmetic M is the number of digits, which allows for generating up to $b^M$ points. It should be noted that the matrix-vector multiplications are performed in the finite field $\mathbb{F}_b$, which requires mappings from and to $\mathbb{F}_b$, that are known by a person skilled in the art, and are additive in $\mathbb{F}_b$, as shown in Equation 6.

$$C_c(a_0(lb^m + k_{j,l}), \ldots, a_{M-1}(lb^m + k_{j,l})) = \qquad \text{Equation 6}$$
$$C_c(0, \ldots, 0, a_m(lb^m), \ldots, a_{M-1}(lb^m)) +$$
$$C_c(a_0(k_{j,l}), \ldots, a_{m-1}(k_{j,l}), 0, \ldots, 0)$$

If C is regular, the inverse mapping as shown in Equation 7 exists.

$$\phi_{b,C}^{-1}(\chi) = \begin{pmatrix} b^1 \\ \vdots \\ b^M \end{pmatrix}^T \left[ C^{-1} \begin{pmatrix} a_{-1}(x) \\ \vdots \\ a_{-M}(x) \end{pmatrix} \right] \quad \text{Equation 7}$$

The components of the Halton sequence shown in Equation 8 are the radical inverses in integer base b, where all bases are relatively prime. In fact, $\phi_b = \phi_{b,C}$ for C=I, the identity matrix.

$$\phi_b: \mathbb{N}_0 \to \mathbb{Q} \cap (0,1) \quad \text{Equation 8}$$

$$i = \sum_{k=0}^{\infty} a_k(i) b^k \mapsto \sum_{k=0}^{\infty} a_k(i) b^{-k-1}$$

Originally, the digit $a_k(i)$ has been the k-th digit of the index i represented in base b. As known to someone skilled in the art, the uniformity of the points then has been improved by applying permutations to the digits before computing the radical inverse.

For $x_{i,c} = \phi_b(i)$, choosing the number of jobs as $N = b^m$, $m \in \mathbb{N}$ yields $$N \cdot x_{i,c} = b^m \cdot \phi_b(i) = b^m \cdot \sum_{k=0}^{\infty} a_k(i) b^{-k-1},$$

whose integer part is a permutation of $\{0, \ldots, N-1\}$, which is repeated every N points. Each job j thus is assigned the set shown in Equation 9, which is known as leapfrogging.

$$P_j = \{x_{l \cdot N + \phi_b^{-1}(\frac{j}{N})}: l \in \mathbb{N}_0\} \quad \text{Equation 9}$$

It should be noted that the offset $\phi_b^{-1}(j/N)$ is constant per job, and for the ease of implementation, the assignment of low-discrepancy subsequences may be permutated to the jobs. In other words, the j-th job may be assigned to the set $P_j = \{x_{l \cdot N + j}: l \in \mathbb{N}_0\}$.

Compared to previous derivations, this argument is simpler and more general as it includes scrambled radical inverses. Additionally, the actual number of jobs N should be chosen as close as possible to the desired number of jobs. The base b (and thus c) should be chosen as large as possible in order to benefit from the better discrepancy and stratification properties of the first dimensions of the Halton sequence.

With respect to (t, s)-sequences in base b, the d-th component $x_{i,d} = \phi_{b,C_d}(i)$ of a matrix-generated (t, s)-sequence in base b may be computed using a generator matrix $C_d$, where $\phi_{b,C_d}$ is defined in Equation 5.

The Sobol' sequence is a common (t, s)-sequence in base b=2. Its generator matrix for the first dimension is the identity matrix I, and thus the first component coincides with the van der Corput radical inverse in base b=2 from Equation 8. As a consequence, all results described in the context of the Halton sequence apply. However, compared to the Halton sequence, the Sobol' sequence in base 2 may be computed much faster.

While $N = b^m$ remains a natural choice for an arbitrary G, determining the set $P_j$ might not result in a simple leapfrogging scheme, because each column of the generator matrix may influence the final result. However, if G is required to generate a (0,1)-sequence, it is known that $C_c$ is invertible. Multiplying a regular matrix to the right of all generator matrices generates the same (t, s)-sequence, except for the numbering of the points. Therefore, in one embodiment, $C_1 C_c^{-1}, \ldots, C_{c-1} C_c^{-1}, I, C_{c+1} C_c^{-1}, \ldots, C_s C_c^{-1}$ may be used as generator matrices for the sequence. The component c may then be generated by the identity matrix $I = C_c C_c^{-1}$, which allows the set $P_j$ to be efficiently determined, as described above.

If $C_c$ is a regular upper triangular matrix, it is possible to compute the indices $i_{j,l}$ for every job without reordering. Due to the upper triangular structure, the m least significant digits of the index can only influence the first m digits of the radical inverse, however, the remaining index digits can influence all digits of the radical inverse, especially its first m digits. Given l and the job number j, Equation 10 may be computed.

$$k_{j,l} = i_{j,l} - lb^m = \phi_{b,C_c}^{-1}\left(\sum_{k=0}^{m-1}(a_k(j) - a_{-k-1}(y_l))b^{-m+k}\right) \quad \text{Equation 10}$$

In this case, the subtraction of the digits has to be performed in $\mathbb{F}_b$ and $y_l = \phi_{b,C_c}(lb^m)$. This formula is best understood by first looking at the case l=0 (i.e. the $N = b^m$ points), where Equation 11 is the inverse permutation generated by $C_c$ that maps the job number to an index.

$$k_{j,0} = i_{j,0} = \quad \text{Equation 11}$$

$$\phi_{b,C_c}^{-1}\left(\sum_{k=0}^{m-1} a_k(j) b^{-m+k}\right) = \phi_{b,C_c}^{-1}(j/N) \in \{0, \ldots, b^m - 1\}$$

For l>0, the contribution of $y_l = \phi_{b,C_c}(lb^m)$ to the in least significant digits of the index has to be compensated. This is accomplished by subtracting the digits $a_{-k-1}(y_l)$ as in Equation 10 based on the additive property from Equation 6.

While in the approach disclosed above the component $x_{i,c}$ is only used for partitioning the sequence, previous approaches implicitly used this component for sampling the integrand. This resulting correlation is the reason for convergence issues. Using the example of a low discrepancy sequence of which one component is the radical inverse $\phi_2$, this failure may be explained. The subsequences of $\phi_2$ resulting from leapfrogging using a power of 2 stride are not of low discrepancy as they reside in strata instead of covering the unit interval.

With respect to rank-1 lattice sequences, for a suitable generator vector $h \in \mathbb{N}^{s+1}$, the points of a rank-1 lattice sequence may be computed by $x_i := \{\phi_{b,C}(i) \cdot h + \Delta\} \in [0,1)^{s+1}$, where $\{.\}$ denotes the fractional part. The radical inverse $\phi_{b,C}$ is defined in Equation 5 and $\Delta := (\Delta_0, \ldots, \Delta_s) \in [0,1)^{s+1}$ is an arbitrary shift vector.

Restricting $C \in \mathbb{F}_b^{M \times M}$ to upper triangular, invertible matrices, the l-th run of $b^m$ points include the first $b^m$ points shifted by $\Delta_l$, as shown in Equation 12.

$$\Delta_l := (\Delta_{l,0}, \ldots, \Delta_{l,s}) = \phi_{b,C}(lb^m) \cdot h \quad \text{Equation 12}$$

The number of jobs may therefore be chosen to be $N = b^m$ and the points of $P_j$ may be enumerated using an index $i_{j,l} := lb^m + k_{j,l}$ with $k_{j,l} \in \{0, \ldots, b^m - 1\}$ of the form introduced in Equation 4. It should be noted that under the above restriction $b^m \phi_{b,C}(k_{j,l})$ is an integer.

Given j and l, $k_{j,l}$ is found by solving the following congruence resulting from taking the integer part $\lfloor . \rfloor$ of the component $x_{i,c} = \{\phi_{b,C}(lb^m + k_{j,l})h_c + \Delta_C\}$ used for job selection multiplied by the number of jobs, as shown in Equation 13.

$$\lfloor b^m \{\phi_{b,C}(lb^m)h_c + \phi_{b,C}(k_{j,l})h_c + \Delta_c\} \rfloor \equiv j \bmod b^m$$

$$\Leftrightarrow \lfloor b^m (\phi_{b,C}(lb^m)h_c + \phi_{b,C}(k_{j,l})h_c + \Delta_c) \rfloor \equiv j \bmod b^m$$

$$\Leftrightarrow \lfloor b^m \phi_{b,C}(lb^m)h_c + (b^m \phi_{b,C}(k_{j,l}))h_c + b^m \Delta_c \rfloor \equiv j \bmod b^m$$

$$\Leftrightarrow (b^m \phi_{b,C}(k_{j,l}))h_c + \lfloor b^m \phi_{b,C}(lb^m)h_c + b^m \Delta_c \rfloor \equiv j \bmod b^m$$

Equation 13

Equation 14 shows the resulting function where $(h_c)^{-1}$ is the modular multiplicative inverse of $h_c$, which can be computed by using the extended Euclidean algorithm.

$$k_{j,l} = \phi_{b,C}^{-1}\left(\left(\left(\frac{(j - \lfloor b^m \phi_{b,C}(lb^m)h_c + b^m \Delta_c \rfloor)}{(h_c)^{-1} \bmod b^m}\right)b^{-m}\right) \in \{0, \ldots, b^m - 1\}\right)$$

Equation 14

It should be noted that this inverse exists if and only if b and $h_c$ are relatively prime. Unless used in a congruence relation, a mod $b^m$ denotes the common residue. In other words, the common residue is the nonnegative integer $x < b^m$, such that $a \equiv x \bmod b^m$.

If C is the identity matrix 1, the inverse permutation $\phi_{b,I}^{-1} \equiv \phi_b^{-1}$ may be omitted, which is more efficient to compute. In addition, $b^m \phi_b(lb^m) = \phi_b(l)$. An alternative and simplifying approach to the case, where the order of the points does not matter, is to multiply the generator matrix C by its inverse $C^{-1}$.

With the derivations above, parallel sampling using (t, s)- and rank-1 lattice sequences may be realized and implemented. Choosing the number n of samples in Equation 2 as a multiple of $N = b^m$, allows one to use finite point sets such as the Hammersley points, (t, m, s)-nets, and rank-1 lattices As an option, straightforward load balancing for a number P of heterogeneous processors may be achieved by selecting N>>P. Subsequently, a simple job queue may be used to distribute jobs among the processors. If the number of jobs is not excessive, the queue synchronization overhead is negligible. The scheme remains deterministic, since the samples of each job do not depend on the processor on which the job is executed.

When independently terminating each job adaptively using the same error threshold, in practice the jobs can be expected to use about similar numbers of samples, because the introduced partitioning scheme preserves low discrepancy over all subsequences. This removes the need of intermediate reductions and costly communication, leaving only communication for the final reduction of the partial sums of Equation 2. Using all partial sequences, the result is computed by a contiguous beginning block of samples of the underlying partitioned sequence followed by a usually quite short segment of partial samples from the underlying sequence.

For radical inverses in base b=2 (e.g. as defined in Equation 5), vector Operations in $F_2$ may become bitwise "or" for addition and "xor" for multiplication. As a consequence, the aforementioned algorithms can be efficiently implemented in hardware. On top of the new capability of using the Sobol' sequence in a parallel environment this allows for an additional increase in sampling speed.

In one embodiment, the scheme may also be implemented such that instead of choosing $N = b^m$, the actual number of jobs is $N < b^m$. The algorithms remain consistent, because each subsequence of a low discrepancy sequences is of low discrepancy. In this case, the ensemble of all samples may not make up for a complete beginning segment of the underlying low discrepancy sequence, which may sacrifice some convergence speed. However, it becomes possible to choose an arbitrary base, especially b=2, which allows for very efficient implementations. The same is true for highly uniform point sequences.

Thus, a method to partition number theoretic point sequences into subsequences that preserve the properties of the original sequence may be implemented. The resulting algorithms may be classified as generalised leapfrogging. Instead of using a number of dimensions that results from multiplying the number of problem dimensions with the processor count, adding only one dimension to the problem dimensions is sufficient for this approach, which, in addition, allows a user to take advantage of the benefits from lower discrepancy.

It should be noted that all presented variants of the scheme are deterministic. In other words, the result is identical for a fixed number N of jobs no matter how many processors are used. As a practical consequence, photon maps may be generated adaptively in parallel, taking full advantage of the much faster generation of (t, s)-sequences in base 2.

Figure 4:
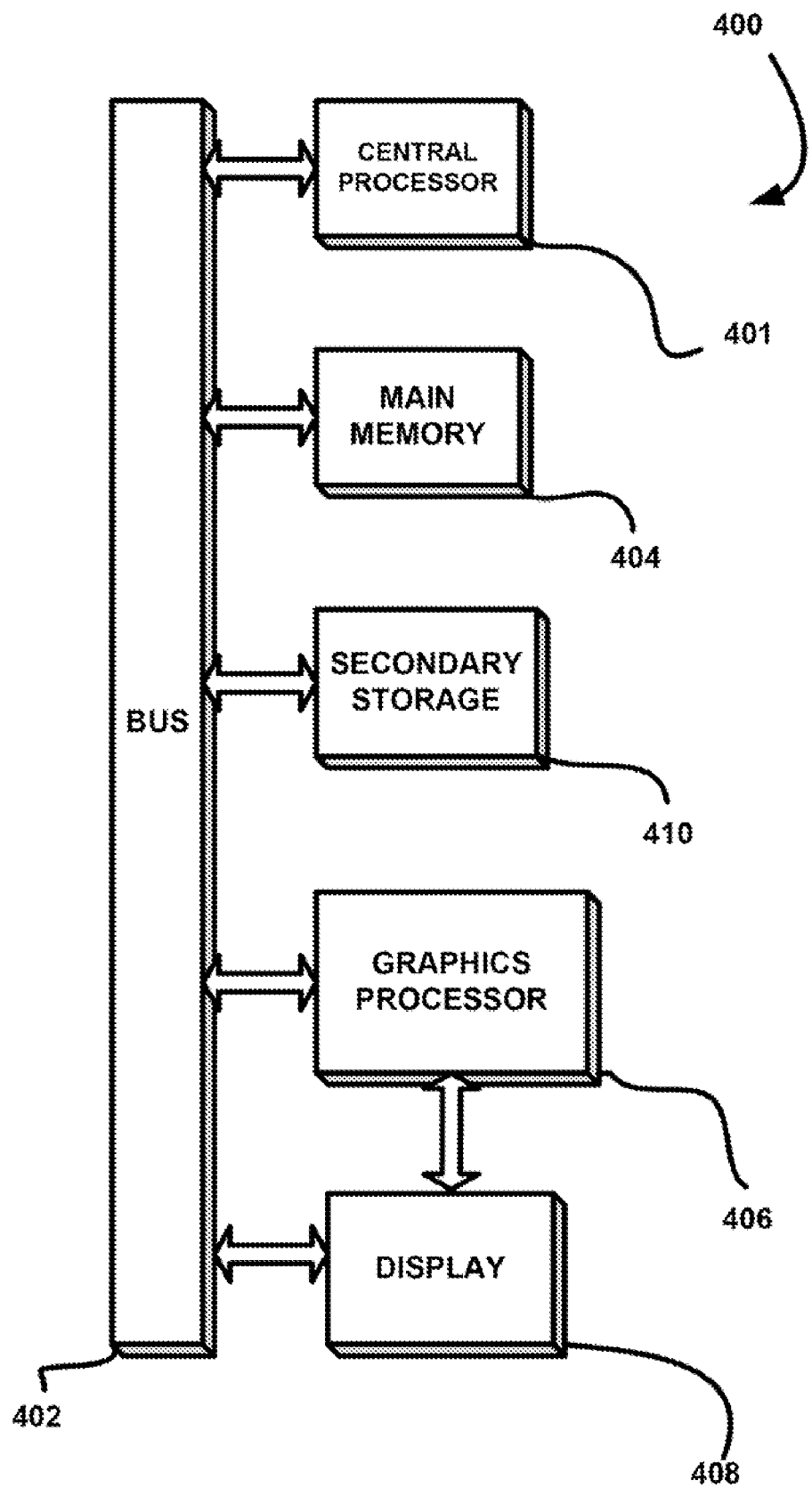
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU). Similarly, in one embodiment, the foregoing modules may be situated on a semiconductor platform like an FPGA and/or other reconfigurable device. As an option, these devices may be in-socket devices.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 419. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a sampling task, the sampling task including a task associated with processing a group of rays or vectors, where the sampling task is associated with at least one of a (t, s)-sequence, and a lattice sequence;
   decomposing the sampling task into a plurality of jobs, where the decomposing includes decomposing the sampling task into a number of samples, the samples taken from at least one of the (t, s)-sequence, and the lattice sequence;
   processing each of the plurality of jobs in parallel; and
   allowing each of the plurality of jobs to terminate independently of other jobs of the plurality of jobs;
   wherein the number of samples is a multiple of $N=b^m$, where N is a number of the plurality of jobs, b is a base of the at least one of the (t, s)-sequence and the lattice sequence, and m is a number of least significant digits utilized for processing the plurality of jobs;
   wherein decomposing the sampling task into the plurality of jobs includes partitioning one low-discrepancy point sequence into a plurality of low discrepancy sequences.

2. The method of claim 1, wherein the processing of at least one of the plurality of jobs is capable of occurring without communication with at least one other of the plurality of jobs.

3. The method of claim 1, wherein each of the plurality of jobs are allowed to terminate independently of the other plurality of jobs without communication with the plurality of jobs.

4. The method of claim 1, wherein decomposing the sampling task into the plurality of jobs includes decomposing the sampling task into s-dimensional samples, where s is an integer.

5. The method of claim 4, wherein stratification properties of sample points are exploited to efficiently generate the s-dimensional samples for each of the plurality of jobs.

6. The method of claim 5, wherein the s-dimensional samples are generated by exploiting a stratification of one dimension of s+1 dimensional samples.

7. The method of claim 5, wherein the s-dimensional samples are generated by stratifying the one of the s dimensions and rescaling resulting samples to cover an entire domain.

8. The method of claim 5, wherein the stratification properties include matrix generated points.

9. The method of claim 5, wherein the stratification properties include permutation generated points.

10. The method of claim 5, wherein the stratification properties include lattice sequences.

11. The method of claim 5, wherein the stratification properties associated with the stratifying are exploited directly to efficiently generate the s-dimensional samples for each of the plurality of jobs.

12. The method of claim 1, wherein only a portion of the plurality of low discrepancy sequences is utilized for processing.

13. The method of claim 1, wherein processing each of the jobs in parallel includes generating photon maps in parallel.

14. The method of claim 1, wherein the sampling task is associated with the (t, s)-sequence and the samples are taken from the (t, s)-sequence, and the base of the (t, s)-sequence is 2.

15. The method of claim 1, wherein the sampling task is associated with the lattice sequence and the samples are taken from the lattice sequence, and the lattice sequence is a rank-1 lattice sequence.

16. The method of claim 15, wherein points of the rank-1 lattice sequence are computed by the equation.

17. A computer program product embodied on a non-transitory computer readable medium, comprising:
   computer code for identifying a sampling task, the sampling task including a task associated with processing a group of rays or vectors, where the sampling task is associated with at least one of a (t, s)-sequence, and a lattice sequence;
   computer code for decomposing the sampling task into a plurality of jobs, where the decomposing includes decomposing the sampling task into a number of samples, the samples taken from at least one of the (t, s)-sequence, and the lattice sequence;
   computer code for processing each of the plurality of jobs in parallel; and
   computer code for allowing each of the plurality of jobs to terminate independently of other jobs of the plurality of jobs;
   wherein the computer program product is operable such that the number of samples is a multiple of $N=b^m$, where N is a number of the plurality of jobs, b is a base of the at least one of the (t, s)-sequence and the lattice sequence, and m is a number of least significant digits utilized for processing the plurality of jobs;
   wherein decomposing the sampling task into the plurality of jobs includes partitioning one low-discrepancy point sequence into a plurality of low discrepancy sequences.

18. An apparatus, comprising:
   one or more processors for identifying a sampling task, decomposing the sampling task into a plurality of jobs, and processing each of the plurality of jobs in parallel, each of the plurality of jobs being allowed to terminate independently of other jobs of the plurality of jobs;

wherein the sampling task includes a task associated with processing a group of rays or vectors, where the sampling task is associated with at least one of a (t, s)-sequence, and a lattice sequence;

wherein the decomposing includes decomposing the sampling task into a number of samples, the samples taken from at least one of the (t, s)-sequence, and the lattice sequence;

wherein the apparatus is operable such that the number of samples is a multiple of $N=b^m$, where N is a number of the plurality of jobs, b is a base of the at least one of the (t, s)-sequence and the lattice sequence, and m is a number of least significant digits utilized for processing the plurality of jobs;

wherein decomposing the sampling task into the plurality of jobs includes partitioning one low-discrepancy point sequence into a plurality of low discrepancy sequences.

19. The apparatus of claim 18, wherein the one or more processors remain in communication with memory.

20. A method, comprising:

identifying a sampling task, the sampling task including a task associated with processing a group of rays or vectors, where the sampling task is associated with at least one of a (t, s)-sequence, and a lattice sequence;

decomposing the sampling task into a plurality of jobs, where the decomposing includes decomposing the sampling task into a number of samples, the samples taken from at least one of the (t, s)-sequence, and the lattice sequence;

processing each of the plurality of jobs in parallel; and allowing each of the plurality of jobs to terminate independently of other jobs of the plurality of jobs;

wherein the number of samples is a multiple of $N=b^m$, where N is a number of the plurality of jobs, b is a base of the at least one of the (t, s)-sequence and the lattice sequence, and m is a number of least significant digits utilized for processing the plurality of jobs;

wherein decomposing the sampling task into the plurality of jobs includes partitioning one highly uniform point sequence into a plurality of highly uniform point sequences.

21. The method of claim 20, wherein only a portion of the plurality of highly uniform point sequences is utilized for processing.

* * * * *